United States Patent
Hayashi et al.

[11] Patent Number: 6,156,107
[45] Date of Patent: Dec. 5, 2000

[54] TRAP APPARATUS

[75] Inventors: Kazuichi Hayashi, Kofu; Yuichiro Fujikawa, Yamanashi-ken, both of Japan

[73] Assignee: Tokyo Electron Limited, Tokyo, Japan

[21] Appl. No.: 09/276,738

[22] Filed: Mar. 26, 1999

Related U.S. Application Data

[63] Continuation-in-part of application No. 08/967,917, Nov. 12, 1997, Pat. No. 5,904,757.

[30] Foreign Application Priority Data

Nov. 13, 1996 [JP] Japan .................................. 8-317124

[51] Int. Cl.⁷ .................................................. B01D 45/08
[52] U.S. Cl. ........................... 96/416; 55/385.1; 55/423; 55/434.4; 55/444; 55/445; 55/446; 55/481; 96/420; 438/905; 438/909
[58] Field of Search ................................ 95/25, 272, 14, 95/18; 96/414, 415, 416, 417, 418, 419, 422, 420; 438/905, 909; 55/385.1, 385.2, 442, 444, 446, 445, DIG. 34, 456, 457, 423, 473, 481, 434.2, 434.3, 434.4

[56] References Cited

U.S. PATENT DOCUMENTS

| | | | |
|---|---|---|---|
| 1,088,187 | 2/1914 | Theisen | 55/446 |
| 1,653,203 | 12/1927 | Connally | 55/446 |
| 1,767,089 | 6/1930 | Miller et al. | 55/444 |
| 1,857,348 | 5/1932 | Bokenkroger | 55/446 |
| 2,290,323 | 7/1942 | Graham | 55/446 |
| 3,524,437 | 8/1970 | Crandall | 55/444 |
| 3,892,550 | 7/1975 | Riis | 55/446 |
| 4,740,220 | 4/1988 | Mark et al. | 55/446 |
| 4,832,715 | 5/1989 | Naruse | 55/446 |
| 4,835,114 | 5/1989 | Satou et al. | 438/905 |
| 5,039,321 | 8/1991 | Satoh et al. | 55/385.2 |
| 5,122,170 | 6/1992 | Satoh et al. | 55/385.2 |
| 5,211,729 | 5/1993 | Sherman | 55/319 |
| 5,246,881 | 9/1993 | Sandhu et al. | 434/909 |
| 5,427,610 | 6/1995 | Croker | 55/444 |
| 5,584,959 | 12/1996 | Kimura et al. | 156/345 |
| 5,584,963 | 12/1996 | Takahashi et al. | 156/646.1 |
| 5,599,732 | 2/1997 | Razeghi | 437/105 |
| 5,788,747 | 8/1998 | Horiuchi et al. | 55/385.1 |
| 5,904,757 | 5/1999 | Hayashi et al. | 96/416 |

FOREIGN PATENT DOCUMENTS 2-61067  3/1990  Japan .

*Primary Examiner*—Duane S. Smith
*Attorney, Agent, or Firm*—Oblon, Spivak, McClelland, Maier & Neustadt, P.C.

[57] ABSTRACT

The trap apparatus of the present invention includes a case provided for a gas exhaust system used for a film forming equipment which carries out a film forming process on an object, a gas supply port, made in the case and connected to an exhaust pipe of the gas exhaust system, for introducing an exhaust gas flowing through the exhaust pipe, into the case, a gas exhaust port, made in the case and connected to an exhaust pipe of the gas exhaust system, for exhausting the exhaust gas flowing through an inner space of the case, to the exhaust pipe, a plurality of partition plates arranged in the case so as to partition the inner space of the case into a plurality of rooms between the gas supply port and the gas exhaust port, a gas distribution port provided in some of the partition plates such that the exhaust gas introduced into the case through the gas supply port, is allowed to flow through the rooms partitioned by the partition plates, in the order, and then exhausted from the gas exhaust port, a trap mechanism housed in each of the rooms, for trapping reaction byproducts contained in the exhaust gas introduced into the case through the gas supply port, and a temperature control mechanism for individually controlling the temperatures in the rooms partitioned by the partition plates.

14 Claims, 10 Drawing Sheets

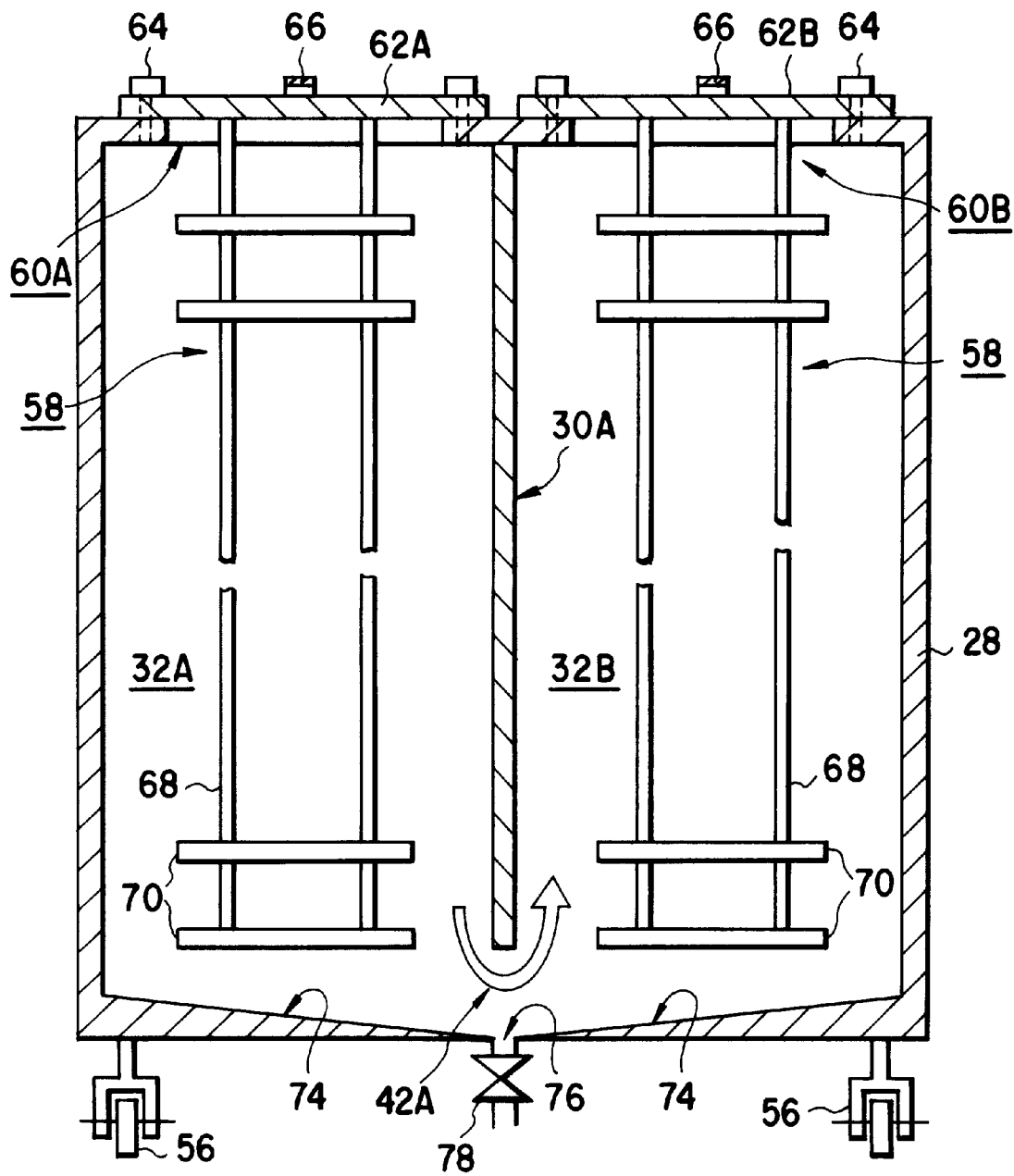
F I G. 3

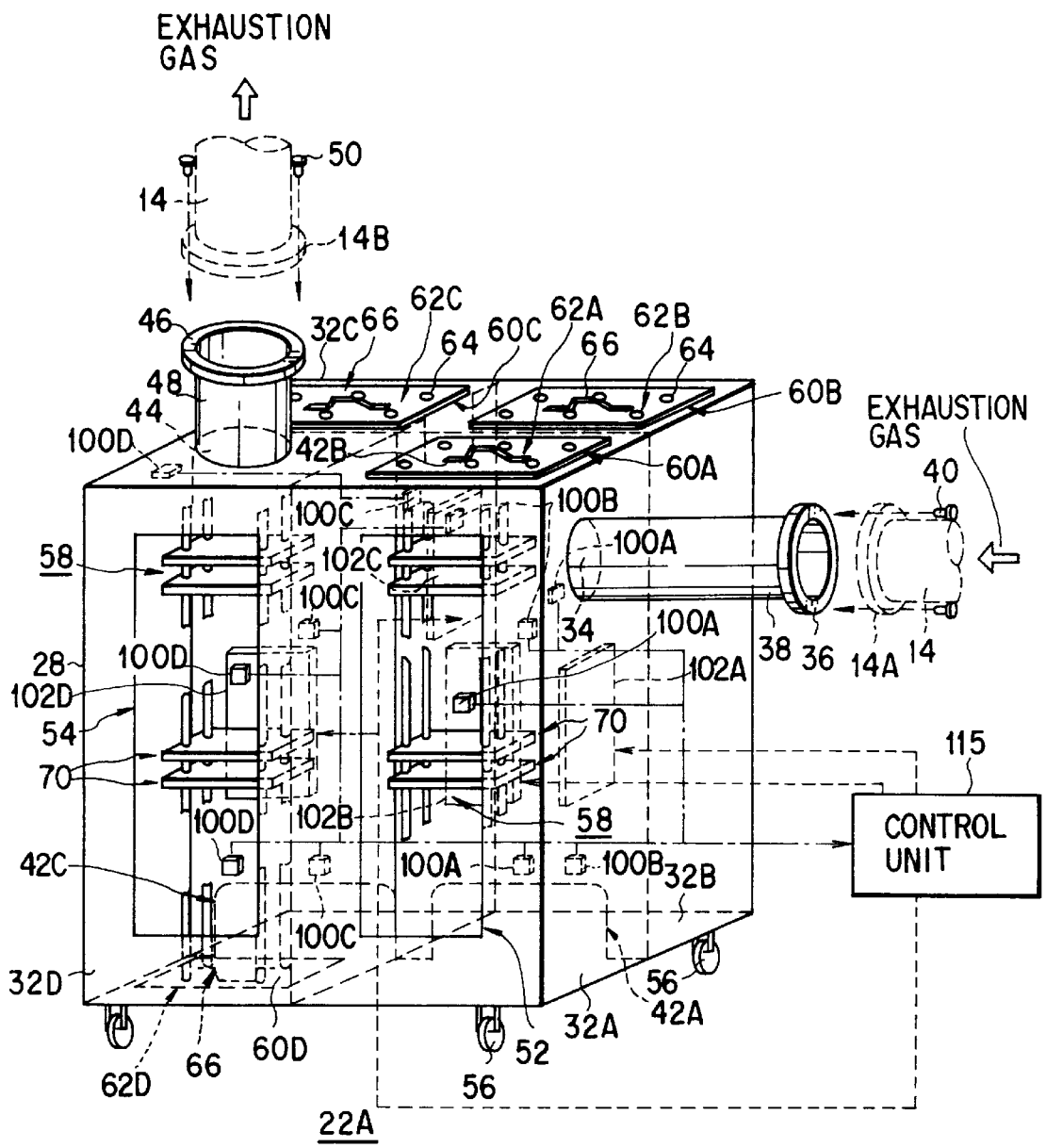
F I G. 13

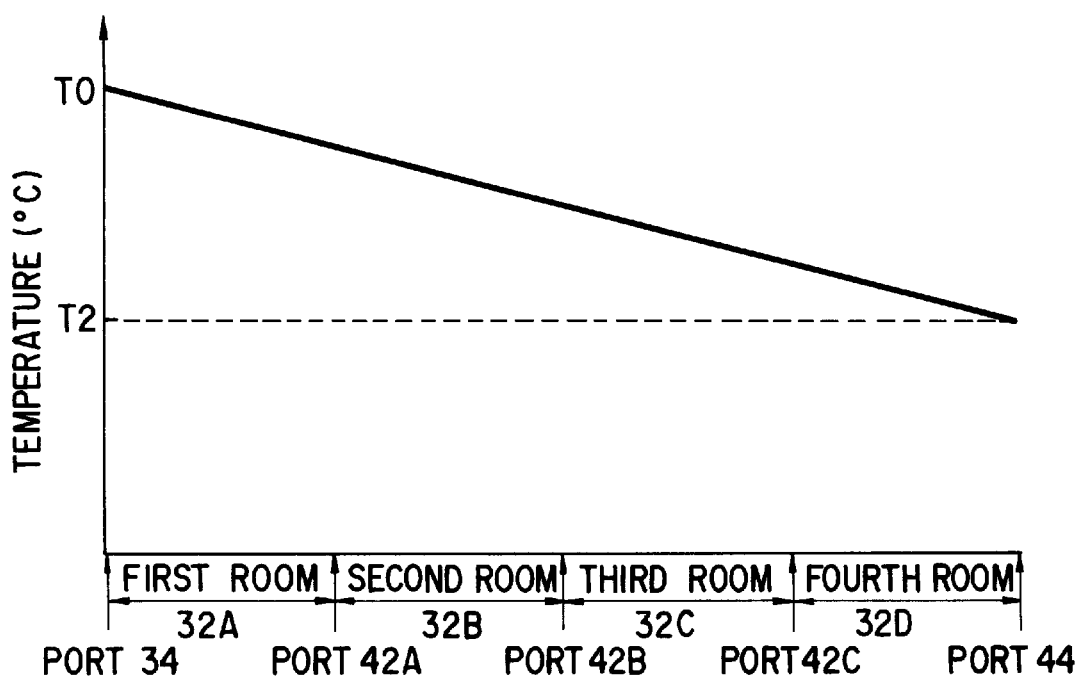
F I G. 14
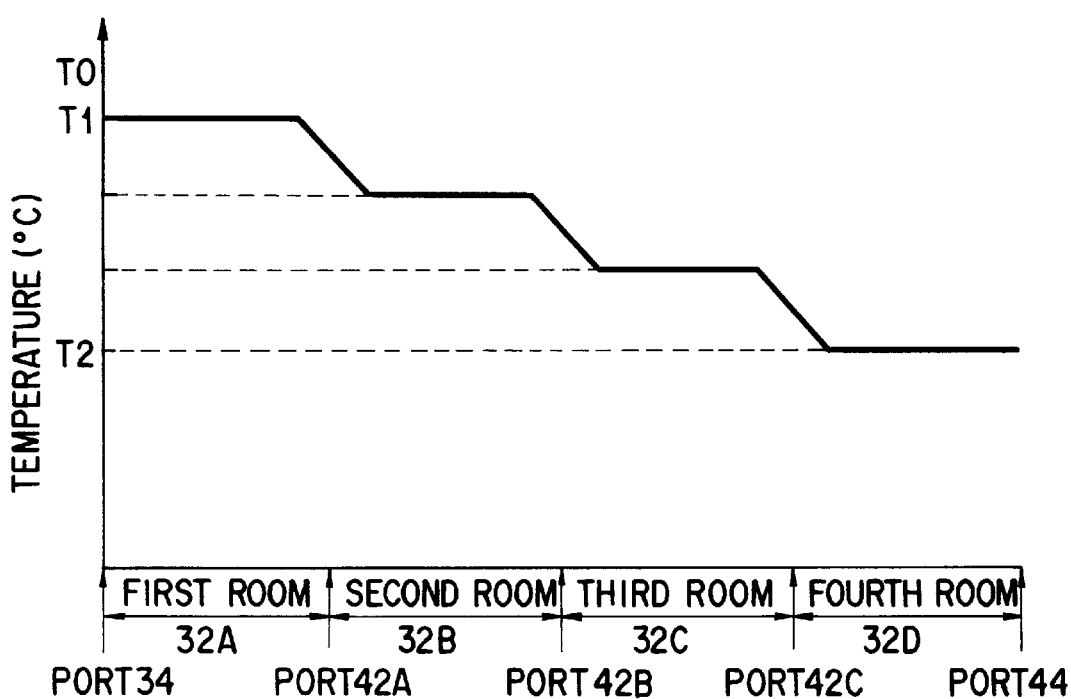
F I G. 15

TRAP APPARATUS

CROSS-REFERENCE TO RELATED APPLICATION

This is a Continuation-in-Part application of U.S. patent application Ser. No. 08/967,917, filed Nov. 12, 1997, now U.S. Pat. No. 5,904,757, issued on May 18, 1999, the entire contents of which are incorporated herein by reference.

BACKGROUND OF THE INVENTION

The present invention relates to a trap apparatus for trapping reaction byproducts contained in an exhaust gas from a film forming equipment for carrying out a predetermined film forming process on an object, so as to eliminate the reaction byproducts.

Generally, in the productions of integrated circuits such as ICs or logic elements, the film forming process for forming a predetermined thin film on an object such as a semiconductor wafer, a glass substrate or a liquid crystal display or (LCD) substrate, and the etching process for etching a formed thin film into a desired pattern, are repeatedly carried out.

For example, in the film forming process, as a predetermined process gas is introduced into a reaction container, and the process gas reacts, a thin film of silicon, a thin film of a silicon oxide or a silicon nitride, a thin film of a metal, or a thin film of a metal oxide or a metal nitride, or similar is formed on a surface of an object. At the same time with the reaction of forming such a film, undesired reaction byproducts are created, which are discarded together with an exhaust gas.

The reaction byproducts, if directly released to the atmosphere, cause environmental pollution or similar. Therefore, as a general case, a trap apparatus is provided for the gas exhaust system extending from the processing container, so as to eliminate the reaction byproducts contained in the exhaust gas by trapping the reaction byproducts with the trap apparatus.

Various types of trap apparatuses, having different structures, have been proposed depending upon the characteristics of the reaction byproducts to be trapped and eliminated. For example, the trap apparatus used for eliminating reaction products which are liquefied or solidified as a condensate at room temperature, is formed to have a structure consisting of a case having a supply port and an exhaust port, for exhaust gas, and a number of fins provided in the case. It should be noted that these fins are arranged in order, each at a different angle with respect to the direction of flow of the exhaust gas, so as to create an exhaust conductance. With this structure, when the exhaust gas passes through the fins, the reaction byproducts contained in the exhaust gas are trapped as they are adhered to the surfaces of the fins.

Trap apparatuses of the conventional type as described above, usually have a single space structure. Due to such a structure, the time period in which the exhaust gas is brought into contact with the fins, is very short. Particularly, when a great amount of process gas is allowed to flow in order to increase the rate of the film formation, reaction byproducts which could not be trapped by the trap apparatus, in some cases, escape to the down-stream side of the trap apparatus.

Further, in the conventional trap apparatuses, since a large number of the fins are arranged at the same pitch, the fins are often blinded by the reaction byproducts adhered thereto. Therefore, reaction byproducts which could not be trapped by the trap apparatus flow down-stream.

As one solution to the above-described problem, it has been proposed to increase the capacity of the trap apparatus. However, if the capacity is simply increased, it is not possible to enhance the trapping efficiency for the increased capacity, Thus, the space occupied by the apparatus has been enlarged for nothing.

BRIEF SUMMARY OF THE INVENTION

An object of the present invention is to provide an easily maintainable and compact trap apparatus capable of trapping reaction products with high efficiency, while not causing blinding of the fins.

The above-stated object can be achieved by a trap apparatus having a structure including: a case provided for a gas exhaust system used for a film forming equipment which carries out a film forming process on an object; a gas supply port, located in the case and connected to an exhaust pipe of the gas exhaust system, for introducing an exhaust gas flowing through the exhaust pipe, into the case; a gas exhaust port, located in the case and connected to an exhaust pipe of the gas exhaust system, for exhausting the exhaust gas flowing through an inner space of the case, to the exhaust pipe; a plurality of partition plates arranged in the case so as to partition the inner space of the case into a plurality of rooms between the gas supply port and the gas exhaust port; a gas distribution port provided in some of the partition plates such that the exhaust gas introduced into the case through the gas supply port, is allowed to flow through the rooms partitioned by the partition plates (in the order in which the rooms are partitioned) and then, exhausted from the gas exhaust port; and a trap mechanism housed in each of the rooms, for trapping reaction byproducts contained in the exhaust gas introduced into the case through the gas supply port, and a temperature control mechanism for individually controlling the temperatures in the rooms partitioned by the partition plates.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawing figures, which are incorporated in and constitute a part of the specification, illustrate presently preferred embodiments of the present invention, and together with the general description given above and the detailed description of the preferred embodiments given below, serve to explain the principles of the present invention.

FIG. 3 is a cross-sectional view taken along the line III—III in FIG. 2;

FIG. 13 is a perspective view of a trap apparatus according to a modification;

FIG. 14 is a graph showing one manner in which the rooms of the trap apparatus, shown in FIG. 13, are controlled in temperature; and FIG. 15 is a graph showing another manner in which the rooms of the trap apparatus, shown in FIG. 13, are controlled in temperature.

DETAILED DESCRIPTION OF THE INVENTION

An embodiment of the present invention will now be described with reference to accompanying drawings.

Figure 1:
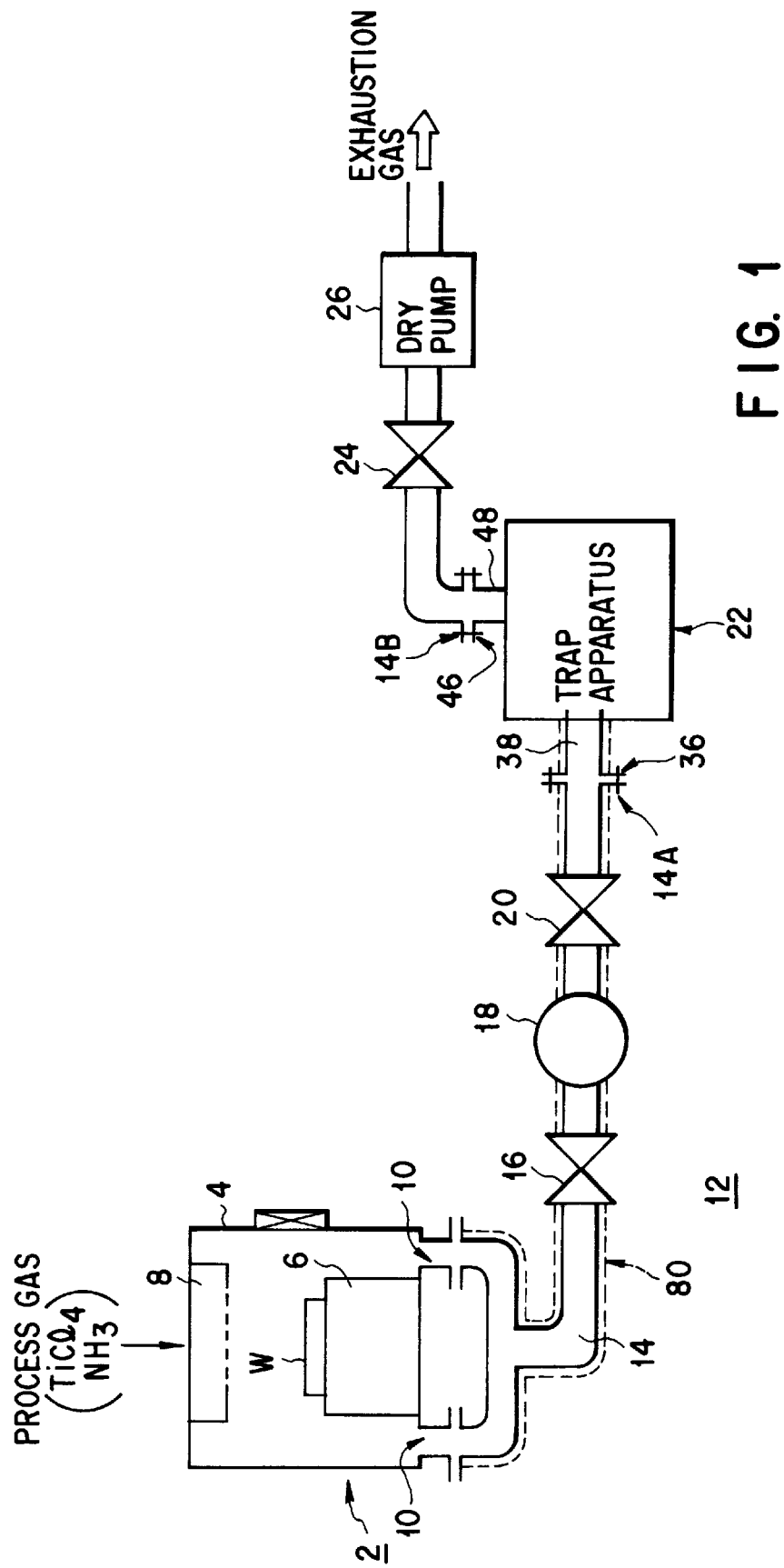
FIG. 1 is a diagram showing a gas exhaust system of a film forming equipment in which a trap apparatus according to an embodiment of the present invention is provided.

FIG. 1 shows a film forming equipment 2 and an gas exhaust system 12 used for the equipment 2. As can be seen in this figure, the film forming equipment 2 includes a process receptacle 4 made of, for example, aluminum. On the inner bottom section of the process receptacle 4, a susceptor 6 is provided. An object, for example, a semiconductor wafer W, is to be placed on the susceptor 6. A shower head 8, used for introducing the process gas into the process receptacle 4, is provided on the upper part of the process receptacle. In this embodiment, as examples of the process gas, $TiCl_4$ and $NH_3$ are used, and a film of TiN (titanium nitride) is formed on the surface of the semiconductor wafer W. Therefore, $NH_4Cl$ (ammonium chloride) is generated as a reaction byproduct. The reaction byproduct for example, be in liquid state at room temperature, and gasified at 150° C., although the characteristics will vary depending upon the purity of the byproduct. Ammonium chloride generated is trapped by the trap apparatus of the embodiment.

In order to create a vacuum within the process receptacle 4, an gas exhaust system 12 is connected to an exhaust port 10 made in the bottom section of the process receptacle 4. The gas exhaust system 12 includes an exhaust path 14 made of, for example, stainless steel, connected to the exhaust port 10. In the exhaust path 14, a gate valve 16, a pump 18 such as a turbo molecular pump, a first open/close valve 20, a trap apparatus 22, according to the embodiment, a second open/close valve 24 and a dry pump 26 are all arranged in the listed order from the upstream side to the down-stream side. It should noted that the gas exhaust system 12 is, in practice, housed compactly in the vicinity of the film forming equipment 2, but it is illustrated in a developed manner in FIG. 1 so that its structure can be easily understood. Further, the position of the trap apparatus 22 is not limited to the position indicated in FIG. 1.

As can be seen in FIGS. 2 to 5, the trap apparatus 22 has a box-shaped case 28 made of, for example, aluminum. The case 28 has a substantially cubical shape with each side having about several tens of centimeters. The inner space of the case 28 is partitioned into four rooms 32A to 32D, each having, for example, a rectangular parallelepiped shape, by four partition plates 30A to 30D arranged in a cross.

A gas supply port 34 is located in the upper side wall of the first room 32A, and a connection pipe 38, having a flange 36, is connected to the gas supply port 34. A flange 14A of the exhaust path 14 is air-tightly connected to the flange 36 via a sealing material or similar (not shown), with bolts 40, such that the exhaust gas can be introduced to the connection pipe 38.

In the lower section of the partition plate 30A which is provided between the first room 32A and the second room 32B, a first gas distribution port 42A is located and has having a relatively large opening area. With this structure, the exhaust gas, introduced to the first room 32A via the gas supply port 34, is allowed to flow downwardly into the first room 32A and then, is introduced into the bottom section of the second room 32B via the first gas distribution port 42 (See FIG. 5).

In the upper section of the partition plate 30B, which is provided between the second room 32B and the third room 32C, a second gas distribution port 42B is located and has a relatively large opening area, is made. With this structure, the exhaust gas, introduced to the second room 32B via the first gas distribution port 42A, is allowed to flow upwardly into the second room 32B and then is introduced to the upper section of the third room 32C via the second gas distribution port 42B (See FIG. 4).

In the lower section of the partition plate 30C, which is provided between the third room 32C and the fourth room 32D, a third gas distribution port 42C is located and has a relatively large opening area. With this structure, the exhaust gas, introduced to the third room 32C via the second gas distribution port 42B, is allowed to flow downwardly into the third room 32C and then, is introduced to the bottom section of the fourth room 32D via the third gas distribution port 42C (See FIG. 5).

Figure 2:
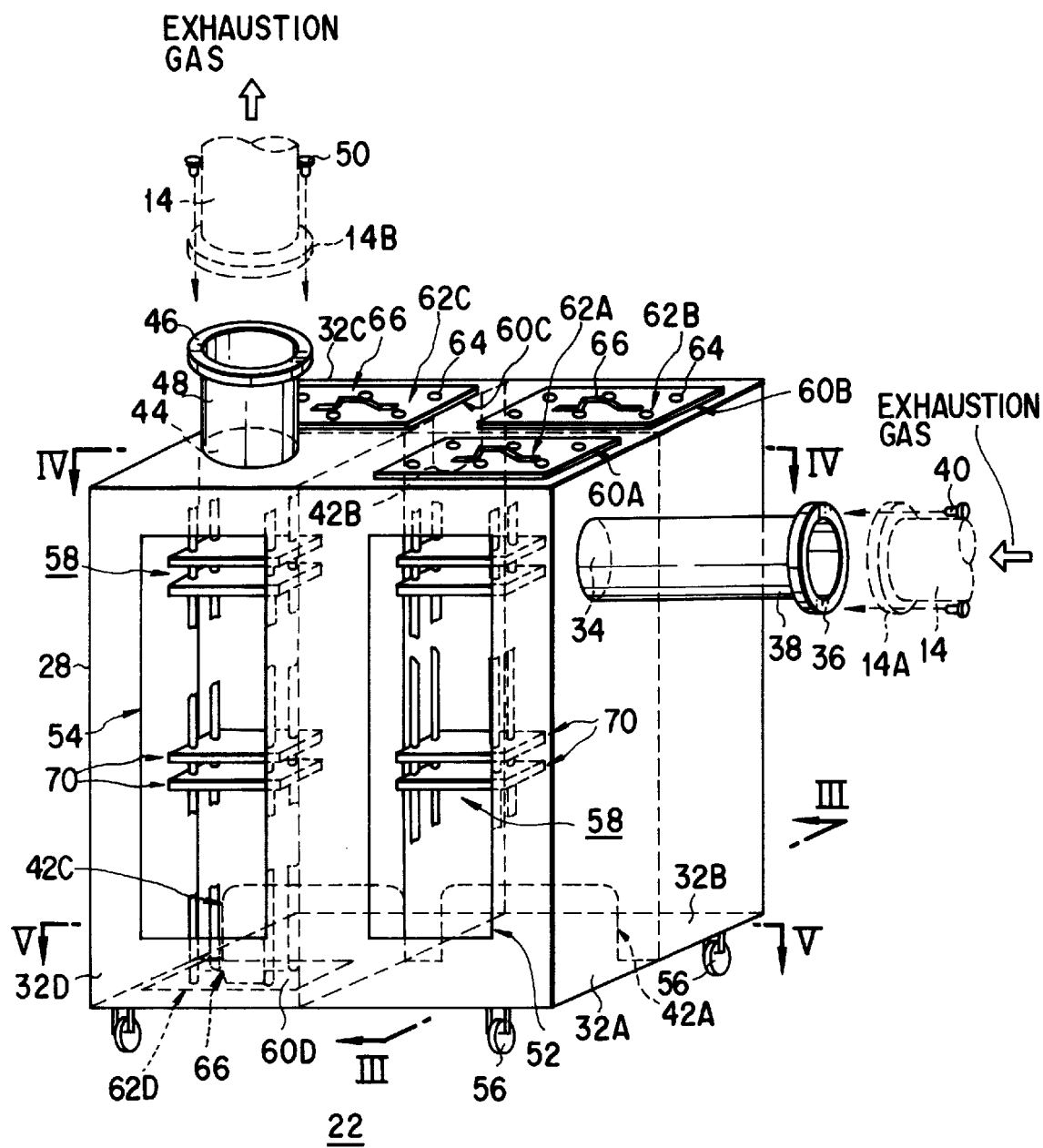
FIG. 2 is a perspective view showing the appearance of the trap apparatus according to the embodiment.
Figure 4:
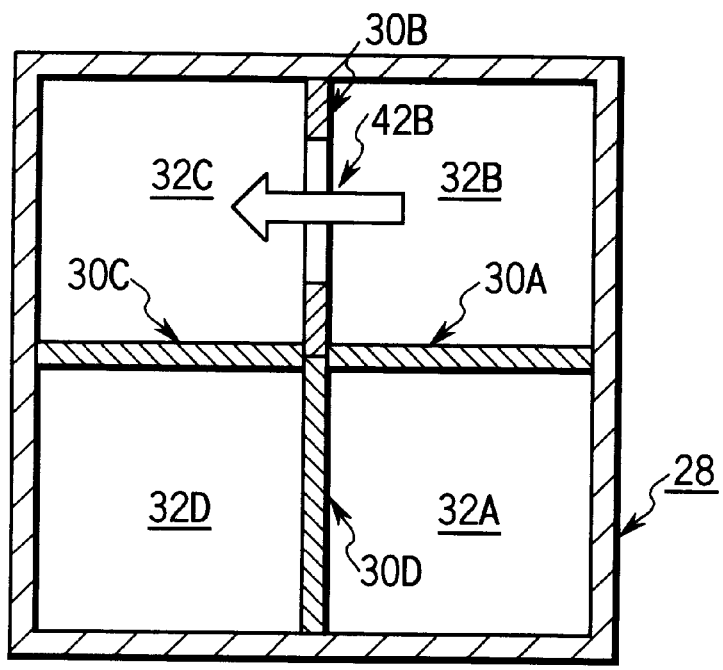
FIG. 4 is a cross-sectional view taken along the line IV—IV in FIG. 2.
Figure 5:
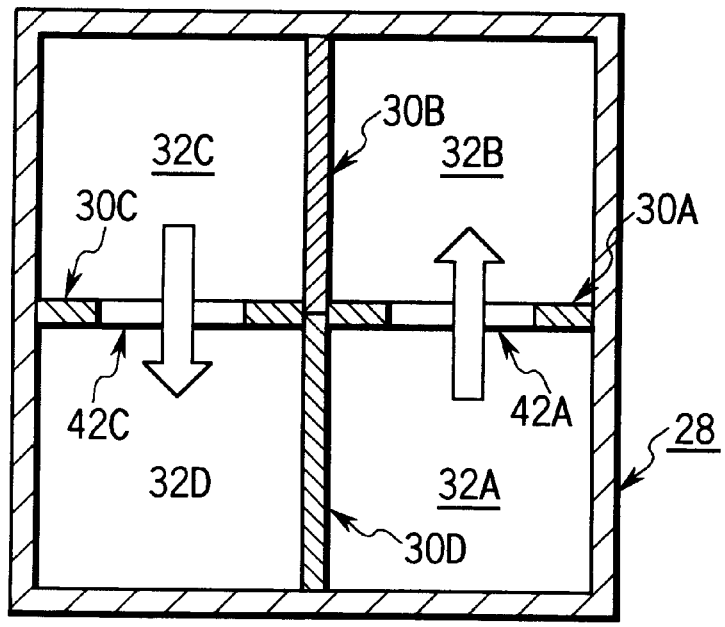
FIG. 5 is a cross-sectional view taken along the line V—V in FIG. 2.

As shown in FIG. 2, a gas exhaust port 44 is located in the ceiling portion of the fourth room 32D. A connection pipe 48, having a flange 46, is connected to the gas exhaust port 44. A flange 14B of the exhaust path 14 is air-tightly connected to the flange 46 via a sealing material or similar (not shown), with bolts 50, such that the exhaust gas in the case 28 can be transferred to the down-stream side. It should be noted that the position of the gas exhaust port 44 may not be in the ceiling portion of the fourth room 32D, but it may be provided in the upper section of the side wall of the fourth room 32D.

In order to monitor the inner states of the first and fourth rooms 32A and 32D, monitor windows 52 and 54 made of, for example, glass, and having a shape elongated in the height direction, are provided in the side walls of the first and fourth rooms 32A and 32D, respectively. It is preferable that the monitor windows 52 and 54 should be provided in the side walls of the second and third rooms 32B and 32C as well. A plurality of casters 56 are provided on the bottom of the case 28 such that the whole apparatus can be easily moved.

In the ceiling portions of the first to third rooms 32A to 32C and in the bottom portion of the fourth room 32D, ports 60A to 60D are located to be used for loading/unloading a trap mechanism, explained later. Each of the ports 60A to 60D is air-tightly closed via cover members 62A to 62D. The cover members 62A to 62D are detachably mounted on the ports 60A to 60D, respectively, with bolts 64. A handle 66 is provided for each of the covers 62A to 62D so as to facilitate the detachment of the covers 62A to 62D from the ports 60A to 60D. It should be noted that the covers 62A to 62D and the ports 60A to 60D should be provided on the side walls of the case 28.

In each of the first to fourth rooms 32A to 32D, trap mechanisms 58 are housed for eliminating reaction byproducts contained in the exhaust gas by trapping them. The trap mechanisms 58 are formed to have the same shape, except that the area or diameter of air pits varies from one to another, as will be described later. Therefore, only the trap mechanism housed in the first room 32A will now be described.

Figure 6:
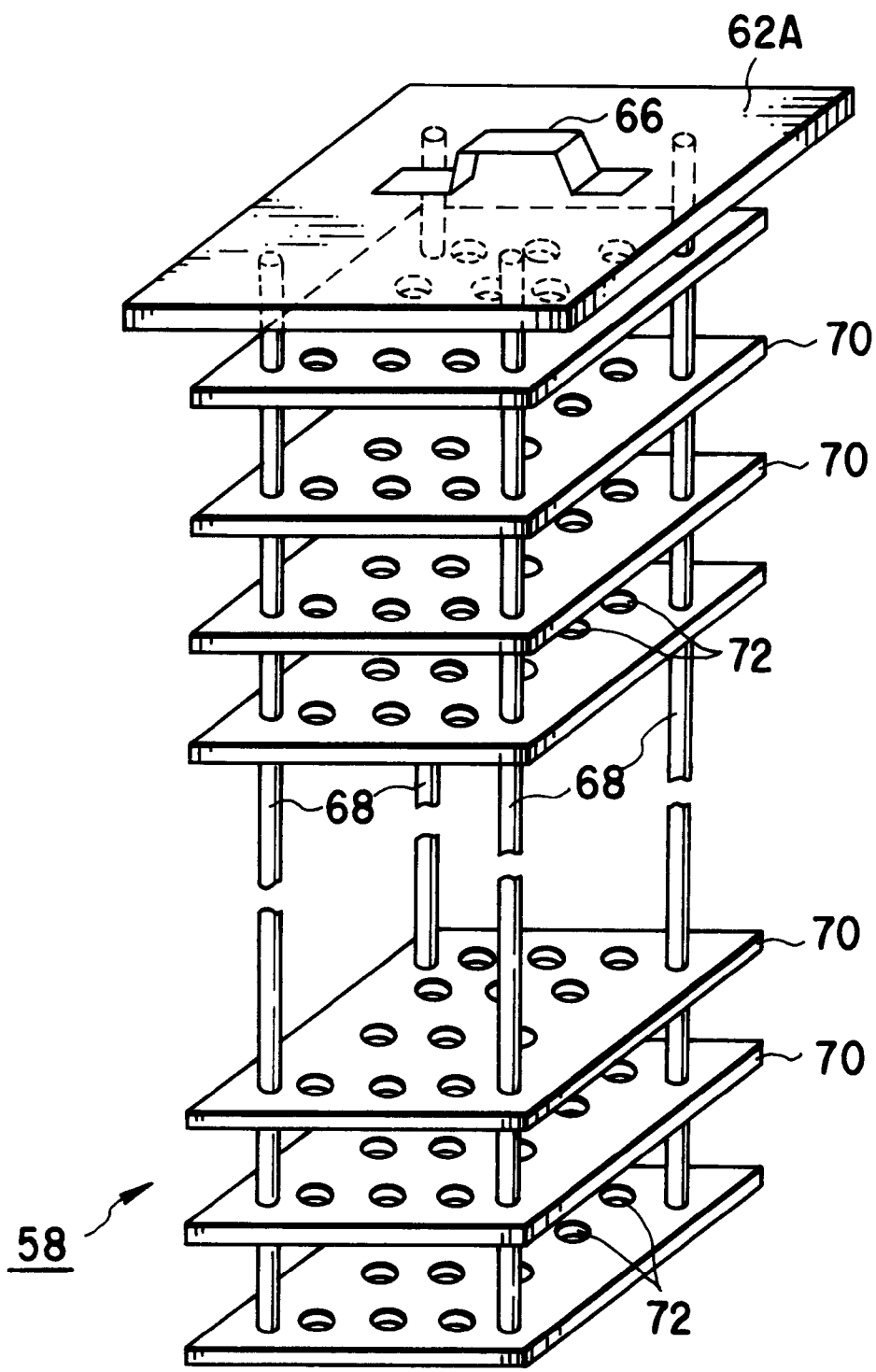
FIG. 6 is a perspective view of a trap mechanism of the trap apparatus.
Figure 7:
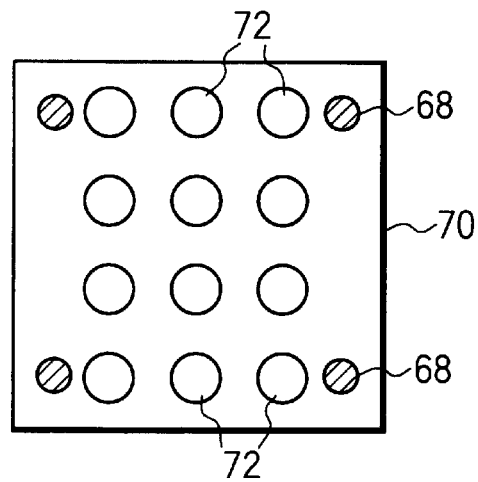
FIG. 7 is a plan view of a trap plate of the trap mechanism.

As can be seen in FIGS. 3 and 6, a trap mechanism 58 includes four supports 68, the upper ends of which are connected and fixed to the cover 62A, and rectangular-shaped trap plates 70, set and fixed to the supports 68 at a predetermined pitch (for example, an interval of about 10 mm to 20 mm). The number of trap plates 70 mounted onto the supports 68 is set to, for example, about twenty. It should be noted that the number of supports 68 is not limited to four. As shown in FIGS. 6 and 7, each trap plate 70 has a great number of air pits 72 through which the exhaust gas passes. In this embodiment, the diameter of the air pits 72 is set to about 10 mm.

Figure 8:
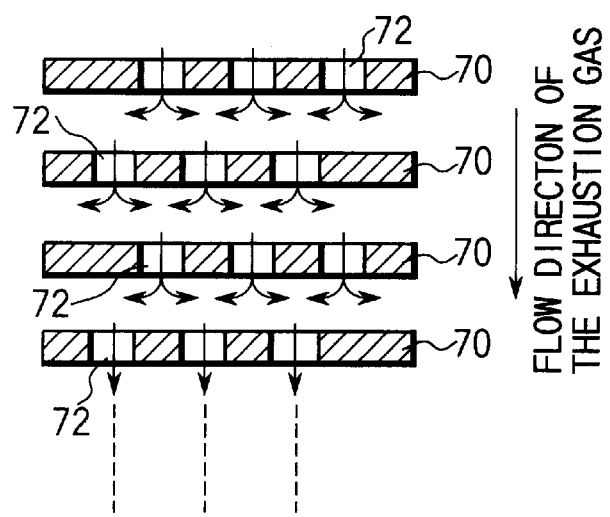
FIG. 8 is a cross-sectional view showing the arrangement of air pits located in a trap plate.

In order that the exhaust gas flows in a zigzag pattern or a staggering pattern, trap plates 70 are arranged adjacent to each other so as to be one above the other, The air pits 72 of these plates 70 are located as can be seen in FIG. 8. With this arrangement, the air pits 72 of the plates 70 are arranged in a zigzag pattern with respect to the flow direction of the exhaust gas. Therefore, a desired exhaust conductance can be obtained to enhance the efficiency of trapping reaction byproducts.

Figure 9:
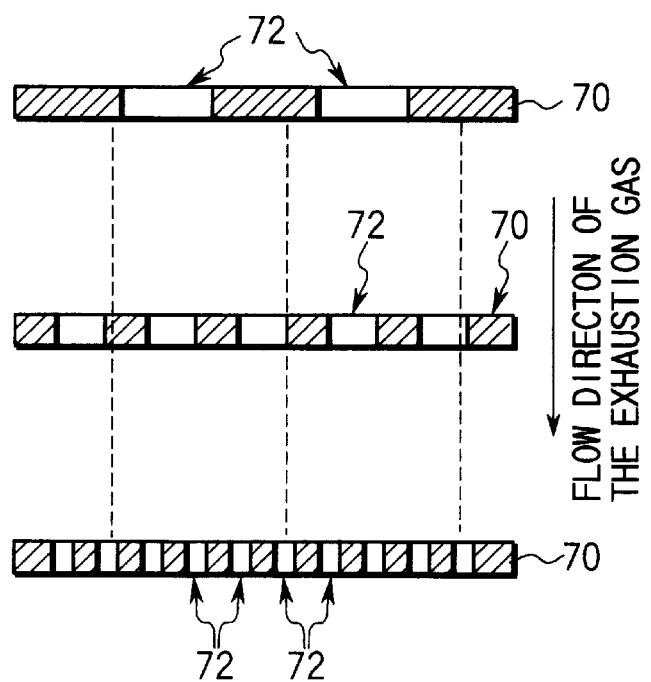
FIG. 9 is a cross-sectional view showing the variation in size of the air pits located in a trap plate.

The opening areas of the air pits 72, to be more specific, the inner diameters thereof, located in these trap plates 70, are not uniform from one plate to another. As can be seen in FIG. 9, the diameters of the air pits 72 are made larger on the upstream side of the gas flow, and those on the downstream side are made smaller. That is, the inner diameters of the air pits 72 gradually or stepwise decrease as the gas flows downstream. It should be noted that in the embodiment, the total opening areas of the air pits 72 located in the trap plates 70 are set to be the same as each other. Therefore, in one trap plate 70, when the opening area of each air pit 72 is smaller, more air pits 72 are provided in that trap plate 70 than in other trap plates 70 having larger air pits. With this structure, the blinding of the air pits 72 is prevented on the upstream side of the gas flow, where the amount of reaction byproduct is larger, and reaction byproducts can be trapped at high precision on the downstream side of the gas flow, where the amount of byproduct is smaller.

The technique of varying the size of the air pits 72 between the upstream and downstream sides of the gas flow, can be applied not only to the trap plates 70 in each of the rooms 32A to 32D, but also to the trap plates 70 provided between the rooms 32A to 32D. More specifically, for example, the diameters of the air pits 72, located in the trap plate 70 located at the most upstream side (the lowermost side) in the second room 32B, are made to be the same as or less than the diameter of the air pits 72 in the trap plate 70 located on the most downstream side (the lowermost side) in the first room 32A. As a whole, in the first room 32A and the third room 32C, the diameters of the air pits 72 gradually decrease from an upper plate to a lower (along the direction of the gas flow), and in the second room 32B and the fourth room 32D, the diameters of the air pits 72 gradually decrease from a lower plate to an upper (along the direction of the gas flow). In this structure, the diameters of the air pits 72, located in the trap plate 70 located at the most upstream side (the uppermost side) in the first room 32A, are set to be largest, and the diameters of the air pits 72, of the trap plate 70. Located on the most downstream side (the uppermost side) in the fourth room 32D are set to be smallest.

As can be seen in FIG. 3, a drain port 76 is made in the bottom portion of the case 28 at a site where the gas distribution port 42A (42C) of the partition plate 30A (30C) is located. The drain port 76 is connected to a liquid exhaust pipe (not shown) via an open/close valve 78. The inner wall 74 of the bottom of the case 28 is inclined downwardly at a predetermined angle towards the drain port 76 such that, for example, a washing solution introduced into the case 28 is guided to the drain port 76 to be easily discarded therefrom. In FIG. 1, a heater 80 is provided for the section of the exhaust path 14, which is located between the exhaust port 10 and the trap apparatus 22. When the heater 80 is heated to, for example, about 150° C., the reaction byproducts flowing through the exhaust path 14 can be maintained in a vapor state.

The effect of the trap apparatus having the above-discussed structure will now be described.

First, as shown in FIG. 1, when a predetermined film forming process is carried out on a wafer W in the process receptacle 4 of the film forming equipment 2, reaction byproducts are mixed into the exhaust gas, which flows through the gas exhaust system 12. For example, in the case where $TiCl_4$ gas and $NH_3$ gas are used as process gases and a titanium nitride film is formed on a wafer W, ammonium chloride is created as a reaction byproduct. Since the section of the exhaust path 14, which continues up to the trap apparatus 22 is heated by the heater 80 to the evaporation temperature (for example, about 150° C.) of this reaction byproduct or higher, the reaction byproduct flows together with the exhaust gas into the trap apparatus 22 without being solidified.

Figure 10:
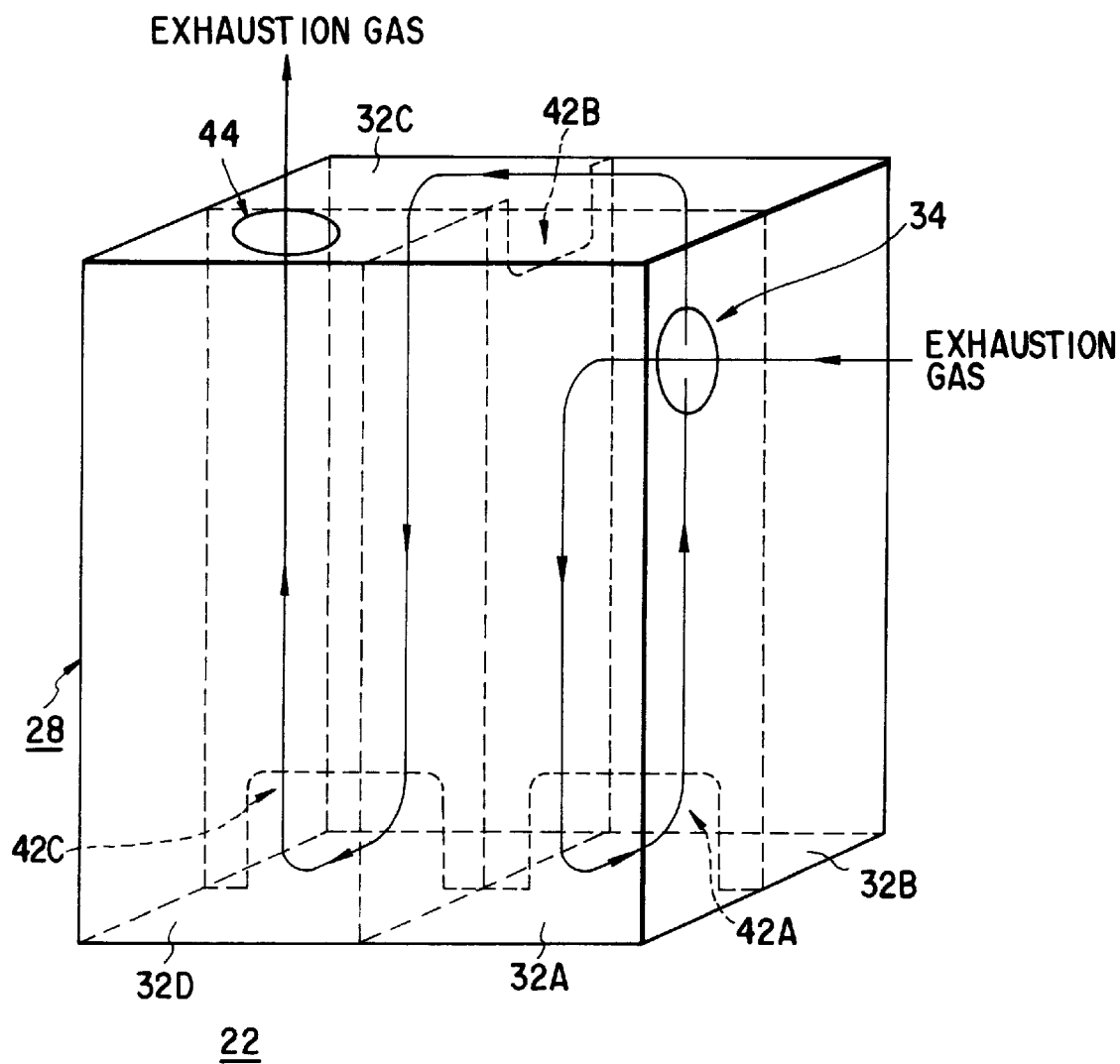
FIG. 10 is a perspective view illustrating the typical behavior of the exhaust gas flowing in the trap apparatus.

FIG. 10 is a diagram typically showing the flow of the exhaust gas in the trap apparatus 22. As can be seen in this figure, the exhaust gas which flows into the upper section of the first room 32A from the gas supply port 34, runs downwardly into the room 32A, and further flows to the bottom section of the second room 32B through the first gas distribution port 42A. Then, the exhaust gas goes up within the room 32B, flows into the upper section of the third room 32C through the second gas distribution port 42B, and goes down within the room 32C. Further, the exhaust gas flows into the bottom section of the fourth room 32D via the third distribution port 42C. After ascending in the room 32D, the gas is exhausted out of the case 28 through the gas exhaust port 44 located in the ceiling portion. During the above-described flow of the exhaust gas, the reaction byproduct is efficiently trapped by the trap mechanisms 58 provided in the rooms 32A to 32D and then, the reaction byproduct to be eliminated. More specifically, as shown in FIG. 8, the exhaust gas flows downwardly to the downstream side as it passes through the air pits 72 of each of the trap plates 70. During this period, pieces of the reaction byproduct are condensed as they hit on the trap plates 70 set at room temperature. The pieces of the reaction byproducts adhere and become trapped on the surfaces of each of the trap plates 70. Since the air pits 72 of the plates are arranged to be in a zigzag pattern from one plate to next, with respect to the gas flow direction, the exhaust gas does not flow straight, but flows in a zigzag path or meanders (see. FIG. 8). With this structure, the possibility that pieces of the reaction byproduct are brought into contact with each of the trap plates 70 is increased, the efficiency for trapping the reaction byproduct is enhanced for the increased possibility. In addition to the zigzag arrangement of the air pits 72 formed between an upper one and an lower one of an adjacent pair of trap plates 70, when the air pits are formed in a zigzag manner in each and every trap plate 70, the trapping efficiency is further improved.

According to the above-described embodiment, the inner space of the case 28 is divided into four rooms, and the exhaust gas flows from the first room 32A to the fourth room 32D, in numerical order. With this structure, the gas flow path can be elongated without increasing the occupying space of the apparatus. Further, in the embodiment, the size of the air pits 72 is set larger on the upstream side of the gas flow, and it is designed to decrease, either gradually or in a step-wise manner as the plate is situated on the further downstream side. Consequently, even if a great amount of reaction byproduct is adhered to the trap plates 70 which are located on the upstream side, and tend to trap an increased amount of byproduct, the blinding of the air pits 72 can be prevented since the air pits 72 on the upstream side are large. Further, although the amount of byproduct adhered to the trap plates 70 situated on the downstream side should become smaller, the possibility of trapping byproduct at a high rate can be maintained as compared to the case of the upstream side, since the air pits 72 on the downstream side are smaller. With this structure, it becomes possible to maintain a high efficiency of trapping reaction byproduct, at high while preventing the blinding of the trap mechanism in the entire apparatus.

The amount of reaction byproduct adhered to the trap plates 70 can be monitored through the monitoring windows 52 and 54 located in the side surface of the case 28. When a great amount of reaction byproduct is trapped, the trap apparatus 22 is removed and subjected to a maintenance operation, including cleaning. The trap apparatus 22 can be removed as follows. That is, first, after a film forming process is completed, the first and second open/close valves 20 and 24 (see FIG. 1) are closed so as to isolate the trap apparatus 22. Then, the bolts 40 and 50, which fix the flanges 36 and 46 of the connection pipes 38 and 48, are loosened and pulled up, and thus the trap apparatus 22 is removed from the exhaust path 14. In the case where the amount of reaction byproduct trapped is small, the case 28 is filled with, for example, a washing solution serving as a solvent, and the whole apparatus is shaken, so as to dissolve and remove the reaction byproduct, adhered to the trap plates 70, into the solution. In the case where the amount of the reaction product trapped is so large that it cannot be easily removed by the above-described simple cleaning operation, the covers 62A to 62D, provided on the ceiling or bottom portions of the rooms 32A to 32D, are taken off by loosening the bolt 64. Then, the trap mechanisms 58, formed to be integrated with the covers 62A to 62D, are taken out of the case 28. In the case where the covers 62A to 62D are not connected to the trap mechanisms 58 as integral bodies, the covers 62A to 62D are taken off, and then the trap mechanisms 58 housed in the rooms are removed normally or by hand. After the trap mechanisms 58 are removed from the case 28, the reaction byproduct trapped is washed off, for example, by immersing the trap mechanisms 59 into a washing solution. At the same time, the reaction byproduct adhered onto the inner surface and similar, of the case 28, is washed off with washing solution.

Regarding the discard of the washing solution from the case 28, most of the washing solution can be discarded from the connection tubes 38 and 48, or discarded from ports 64A to 64D when the covers are off. However, it is difficult to eliminate the washing solution remaining in the case 28 completely in a short time. However, in this embodiment, the inner walls 74 of the bottom section of the case 28 are formed to have a tapered surface as can be seen in FIG. 3, and therefore the washing solution remaining in the case 28 flows down along the tapered surface into the drain port 76. Consequently, when the drain open/close valves 78 are opened, the remaining solution can be easily discarded. With the described structure, even if the flow path of the exhaust gas in the trap apparatus is elongated, each trap mechanism 58 can be taken out easily from the case 28, thus making it possible to facilitate the maintenance operation.

Figure 11:
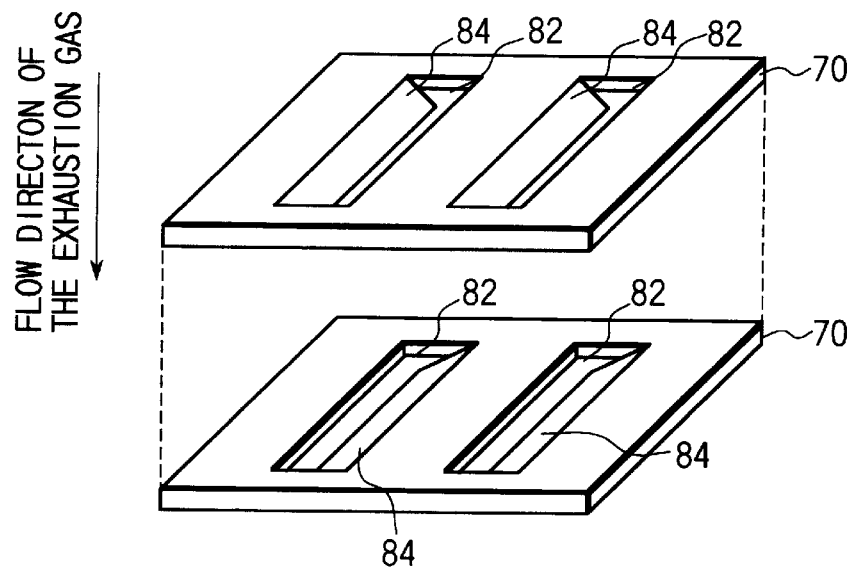
FIG. 11 is a perspective view showing another version of the trap plate.

In the meantime, the number of trap plates 70, the pitch of the plates arranged, the size of air pits 72, and similar are set appropriately in consideration of the amount, characteristics and similar, of reaction byproduct to be trapped. In this embodiment, the trap mechanisms 58 employ trap plates 70 in which air pits 72 of an elliptical or circular shape are made. However the structure of the trap mechanisms is not limited to this. Alternatively, for example, as shown in FIG. 11 it is possible that rectangular cuts are made in trap plates 70, and the cut sections are bent at a predetermined angle towards the exhaust gas flow direction, thus forming rectangular air pits 82 and fins 84. In this structure, not only the air pits 82 should be arranged in a zigzag pattern between the plates with respect to the exhaust gas flow direction, but also the fins 84 should be arranged such that the inclining directions thereof between plates are opposite to each other with respect to the gas flow direction. Thus, the high efficiency of the trapping of reaction byproduct can be maintained.

Further, as a trap mechanism, a conventionally employed type, for example, one having a great number of fins, can also be used.

Figure 12:
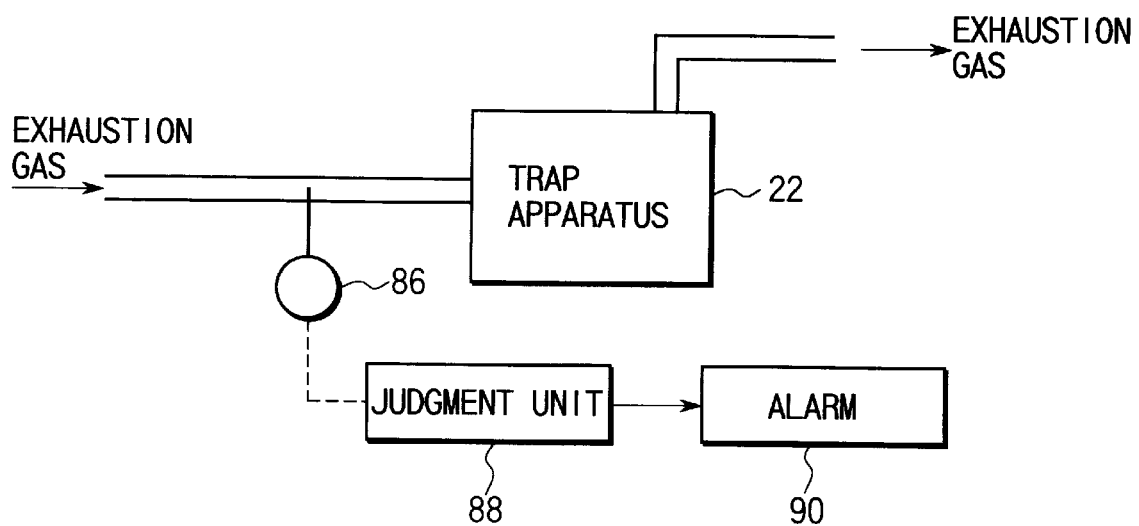
FIG. 12 is a diagram showing the arrangement of circuits, designed to automatically notify the maintenance timing for the trap apparatus.

In the above embodiment, the state of the trap mechanism to which byproduct is adhered, is monitored by the operator through the monitor windows, and the timing of the cleaning is decided. However the cleaning and it may be automatically carried out. In this case, for example, as can be seen in FIG. 12, a flow meter 86 is provided for a section of the exhaust path 14, which is located on either the upstream side or the downstream side of the trap apparatus 22 (in this figure, it is provided on the upstream side), and a flow amount value, detected by the flow meter, is compared with a predetermined threshold value at a judgment unit 88 of a microcomputer or similar, so as to decide if a maintenance is necessary or not. For example, when a certain amount or more of reaction byproduct is trapped, the exhaust conductance becomes large, and therefore the flow amount of the exhaust gas is decreased. When the flow amount becomes equal to or lower than the threshold value, an alarm 90 is operated to notify the operator that maintenance is necessary. In place of the flow meter 86, a manometer may be provided. When a manometer is placed on the upstream side of the trap apparatus 22, the pressure increases when a certain amount or more of reaction byproduct is trapped, and therefore its threshold should be detected. When it is placed on the downstream side, a reverse phenomenon occurs, and therefore the decrease in pressure should be detected.

As described above, according to the trap apparatus of the present invention, excellent operational effects can be obtained as will now be summarized. That is, the exhaust gas introduced into the case passes through all the rooms, in numerical order, via the gas distribution port made in the partition plates, and during this period, reaction byproduct contained in the exhaust gas is trapped with the trap mechanisms provided in the rooms, and then the reaction byproduct is eliminated. With this structure, the exhaust gas flows through these rooms, one after another, in numerical order, and therefore the length of the gas flow path can be increased. Consequently, the efficiency for trapping reaction byproduct can be enhanced. More specifically, the inner space of the case is partitioned into a plurality of rooms, in each of which, a trap mechanism is provided, and the exhaust gas is allowed to flow from one room to another, in numerical order. Therefore, the flow path can be elongated while the size of the apparatus is compact, and the reaction byproduct contained. in the exhaust gas can be efficiently eliminated.

Moreover, in each of the trap mechanisms, trap plates each having air pits, are arranged at a certain pitch, making it possible to achieve a simple structure and suppressing the occurrence of blinding of the plates or similar. Further, the air pits are arranged in a zigzag pattern between the plates, with respect to the exhaust gas flow direction, and with this arrangement, the exhaust gas flows in a zigzag path or meanders. Consequently, the possibility that the exhaust gas hits each trap plate, increases. Thus, the reaction byproduct can be more efficiently trapped. Furthermore, the opening areas of the air pits are gradually decreased as the exhaust gas flows downstream. With this structure, the occurrence of blinding can be further suppressed, and the efficiency of trapping the reaction byproduct can be further enhanced. In other words, the opening areas of the air pits, located on the upstream side of the exhaust gas flow where the trapping amount is greater, are set to be relatively large, so as to prevent blinding of these holes, and the reaction byproduct remaining the downstream of the gas flow can be efficiently trapped since the opening area of one air pit is smaller on the downstream side. Furthermore, with a trap mechanism and a cover being are formed as an integral unit, the trap mechanism can be very easily loaded or unloaded by removing the cover which comes out with the trap mechanism for a maintenance operation, thus facilitating the maintenance operation. Furthermore, the monitor window is provided in one wall of the case so that the inside of the case can be monitored, and therefore the amount of the reaction byproduct trapped can be detected so as to know an appropriate maintenance timing. Furthermore, the drain port is located made in the case, and the inner walls of the case are formed into a tapered surface which continue towards the drain port, and therefore the washing solution, after washing the inner space of the case, can be made to flow on the tapered surface and discarded from the drain port quickly. Thus, the maintenance operation can be efficiently carried out.

FIG. 13 is a perspective view showing how the trap apparatus 22 of the above embodiment is modified.

The trap apparatus 22A of the embodiment is similar to the trap apparatus 22 of the above embodiment, except for the structural features described below. In the description below, therefore, the same reference symbols or numerals will be used to denote corresponding or similar structures, and an explanation of such structures will be omitted.

As shown in FIG. 13, the trap apparatus 22A has four rooms 32A–32D defined by partition plates 30A–30D, and a plurality of temperature sensors 100A–100D and heaters 102A–102D are arranged in those rooms 32A–32D. To be more specific, the first room 32A is provided with three temperature sensors 100A inside: one being located substantially in the central region thereof; another being located in the neighborhood of a gas supply port 34; and the last one being located in the neighborhood of a first gas distribution port 42A through which the first room 32A communicates with the second room 32B. The first room 32A is also provided with heater a 102A. Likewise, the second room 32B is provided with three temperature sensors 100B inside: one being located substantially in the central region thereof; another being located in the neighborhood of the first distribution port 42A through which the second room 32B communicates with the first room 32A; and the last one being located in the neighborhood of a second gas distribution port 42B through which the second room 32B communicates with the third room 32C. The second room 32B is also provided with heater a 102B. Likewise, the third room 32C is provided with three temperature sensors 100C inside: one being located substantially in the central region thereof; another being located in the neighborhood of the second distribution port 42B through which the third room 32C communicates with the second room 32B; and the last one being located in the neighborhood of a third gas distribution port 42C through which the third room 32C communicates with the fourth room 32D. The third room 32C is also provided with heater a 102C. Likewise, the fourth room 32D is provided with three temperature sensors 100D inside: one being located substantially in the central region thereof; another being located in the neighborhood of a gas exhaust port 44; and the last one being located in the neighborhood of the third gas distribution port 42C through which the fourth room 32D communicates with the third room 32C. The fourth room 32D is also provided with heater a 102D.

Each of the temperature sensors 100A–100D is connected to a control unit (controller) 115. Information on the temperatures sensed by the temperature sensors 100A–100D are supplied to the controller 115. The heaters 102A–102D are also connected to the controller 115. On the basis of the information on the temperatures sensed by the temperature sensors 100A–100D, the controller 115 individually controls the heaters 102A–102D. To be specific, the controller 115 performs temperature control in such a manner that the trap apparatus 22A has a temperature gradient from the gas supply port 34 to the gas exhaust port 44. As shown in FIG. 14, for example, the temperature in the neighborhood of the gas supply port 34 is controlled to be approximately the same as the evaporation temperature T0 of a reaction byproduct contained in the exhaust gas (i.e., a temperature at which the reaction byproduct does not coagulate—150° C. for example). The temperature in the neighborhood of the gas exhaust port 44 is controlled to be approximately the same as the temperature T2 of the room in which the trap apparatus 22A is installed. The temperatures in the rooms 32A–32D are controlled to decrease in a substantially linear manner from the gas supply port 34 to the gas exhaust port 44. To attain this condition, the controller 115 individually controls the heaters 102A–102D on the basis of the temperature information supplied from the temperature sensors 100A–100D.

As shown in FIG. 15, the temperature control may be performed in such a manner that the temperatures in the rooms 32A–32D decrease in a step-wise manner from the gas supply port 34 to the gas exhaust port 44. According to the temperature control shown in FIG. 15, the temperature in the neighborhood of the gas supply port 34 is controlled to be approximately the same as the evaporation temperature T0 of a reaction byproduct contained in the exhaust gas, the temperature in the neighborhood of the gas exhaust port 44 is controlled to be approximately the same as the temperature T2 of the room in which the trap apparatus 22A is installed, and the temperature in the first room 32A is kept slightly lower than the evaporation temperature T0 (i.e., it is kept at a temperature that causes the reaction byproduct to coagulate and attach to trap plates 70). In addition, the temperature in the second room 32B is kept at a predetermined temperature which is slightly lower than the temperature in the first room 32A, the temperature in the third room 32C is kept at a predetermined temperature which is slightly lower than the temperature in the second room 32B, and the temperature in the fourth room 32D is kept at a predetermined temperature which is lower than the temperature in the third room 32C. In this case, the temperatures in the vicinity of the gas distribution ports 42A–42C, through which the rooms 32A–32D communicate with each other, are controlled to form a substantially linear gradient of predetermined degrees.

As can be seen from the above description, a large amount of byproduct is prevented from attaching to the gas supply port 34 and the surrounding portions, by performing temperature control, in such a manner that the trap apparatus has a temperature gradient from the gas supply port 34 to the gas exhaust port 44.

The reaction byproduct, discharged from the process receptacle 4, and the exhaust gas are introduced into the gas supply port 34, while being heated by the heater 80 to a temperature higher than the evaporation temperature, as shown in FIG. .1. If the temperatures inside the trap apparatus are the same as the temperature in the room in which the trap apparatus is installed, the reaction byproduct drops to the room temperature as soon as it is introduced into the gas supply port 34. As a result, the reaction byproduct will attach concentratedly on the gas supply port 34 and the surrounding portions. Due to this, the gas supply port 34 may become clogged with the reaction byproduct. Therefore, the trap apparatus must be cleaned frequently, lowering the operation rate of the trap apparatus. This problem can be solved by executing temperature control, such that the trap apparatus has a temperature gradient from the gas supply port 34 to the gas exhaust port 44.

In the above-described embodiment, the inner space of the case is partitioned into four rooms in the vertical direction. However the number of rooms is not limited to four, and the inner space of the case can be partitioned in a lateral direction. In the embodiment, the reaction byproduct is trapped with trap plates which are set at room temperature. However, it is possible that a coolant pipe, in which a coolant flows, is provided for each trap plate, so as to cool the trap plate and promote the condensation of the reaction byproduct in a vapor state, the byproduct being trapped in a condensate form. Another embodiment was described wherein ammonium nitride was eliminated as the reaction byproduct. However, the present invention is not limited thereto, but it can be applied to any other case as long as the reaction byproduct becomes condensate at room temperature or less. Lastly, an embodiment was described wherein a film forming process was carried out on a semiconductor wafer. However, the present invention is not limited thereto, but it can be applied to LCD substrates, glass substrates and similar.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed as new and desired to be secured by Letter Patent of the United States is:

1. A trap apparatus comprising:
    a case provided for a gas exhaust system used for a film forming equipment which carries out a film forming processing on an object;
    a gas supply port, located in said case and connected to an exhaust pipe of said gas exhaust system, for introducing an exhaust gas, which flows through said exhaust pipe into said case;
    a gas exhaust port, located in said case and connected to said exhaust pipe of said gas exhaust system, for exhausting said exhaust gas, which flows through an inner space of said case to said exhaust pipe;
    a plurality of partition plates arranged in said case so as to partition said inner space of said case into a plurality of rooms between said gas supply port and said gas exhaust port;
    a gas distribution port provided in some of said plurality of partition plates such that said exhaust gas introduced into said case through said gas supply port, is allowed to flow through said plurality of rooms partitioned by said plurality of partition plates and then be exhausted from said gas exhaust port;
    a trap mechanism housed in each of said plurality of rooms, for trapping reaction byproducts contained in said exhaust gas introduced into said case through said gas supply port; and
    a temperature control mechanism for individually controlling temperatures in said rooms partitioned by said plurality of partition plates, wherein said temperature control mechanism includes heaters located in said rooms partitioned by said plurality of partition plates, temperature sensors located in said plurality of rooms for sensing temperatures in said plurality of rooms, and a controller for individually controlling said heaters based on temperature information supplied from said temperature sensors.

2. The trap apparatus according to claim 1, wherein said controller individually controls said heaters such that said temperatures in said plurality of rooms decrease from said gas supply port to gas exhaust port with a predetermined temperature gradient.

3. The trap apparatus according to claim 2, wherein said controller individually controls aid heaters such that, when a first room and a second room of said plurality of rooms are adjacent to each other and are communicating with each other, a temperature of said first room, which is located upstream with respect to an exhaust gas flow, is higher than a temperature of said second room, which is located downstream with respect to said exhaust gas flow.

4. The trap apparatus according to claim 2, wherein a temperature at a location near said gas supply port is controlled to be substantially equal to an evaporation temperature of said reaction byproducts contained in said exhaust gas, and a temperature at a location near said exhaust gas port is controlled to be substantially equal to a temperature in a room of said plurality of rooms where said trap apparatus is installed.

5. The trap apparatus according to claim 1, wherein said trap mechanism further comprises a plurality of trap plates for trapping said reaction byproduct contained in said exhaust gas, and holding means for holding each of said pain of trap plates at a predetermined position.

6. The trap apparatus according to claim 5, wherein each of said plurality of trap plates has a plurality of air pits located therein.

7. The trap apparatus according to claim 6, wherein said plurality of air pits located in each of said plurality of trap plates are arranged in a zigzag shape arrangement with respect to a direction of said flow of said exhaust gas, between each of said plurality of trap plates.

8. The trap apparatus according to claim 6, wherein an opening area of each of said plurality of air pits is decreased any one of continuously and in a step-wise manner as said exhaust gas flows downstream.

9. The trap apparatus according to claim 8, wherein a total of said opening areas of each of said plurality of air pits is set to be equal between all of said plurality of trap plates.

10. The trap apparatus according to claim 1, wherein a loading and unloading port is located in aid case so as to any one of load and unload said trap mechanism, and a cover is detachably mounted on said loading and unloading port.

11. The trap apparatus according to claim 10, wherein said trap mechanism is connected to said cover as an integral form.

12. The trap apparatus according to claim 1, wherein a window is provided for said case, and insides of each of said plurality of rooms can be monitored through said window.

13. The trap apparatus according to claim 1, wherein said case has a drain port for discarding a liquid introduced to said case, opening and closing means for any one of opening and closing said drain port, and guide means for guiding the liquid attached to an inner wall of said case to said drain port.

14. The trap apparatus according to claim 13, wherein said guide means is an inclined surface formed in said inner wall of said case, for guiding the liquid towards said drain port.

* * * * *